(12) United States Patent
Takenaka (10) Patent No.: US 10,071,599 B2
(45) Date of Patent: Sep. 11, 2018

(54) MOTORCYCLE TIRE

(71) Applicant: SUMITOMO RUBBER INDUSTRIES, LTD., Kobe-shi, Hyogo (JP)

(72) Inventor: Kouji Takenaka, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 98 days.

(21) Appl. No.: 14/916,108

(22) PCT Filed: Aug. 28, 2014

(86) PCT No.: PCT/JP2014/072610
§ 371 (c)(1),
(2) Date: Mar. 2, 2016

(87) PCT Pub. No.: WO2015/045723
PCT Pub. Date: Apr. 2, 2015

(65) Prior Publication Data
US 2016/0200149 A1 Jul. 14, 2016

(30) Foreign Application Priority Data

Sep. 24, 2013 (JP) .................. 2013-197315

(51) Int. Cl.
*B60C 11/03* (2006.01)
(52) U.S. Cl.
CPC ........ *B60C 11/0302* (2013.01); *B60C 11/032* (2013.01); *B60C 11/033* (2013.01);
(Continued)
(58) Field of Classification Search
CPC ... B60C 11/03; B60C 11/0302; B60C 11/032; B60C 11/033; B60C 11/0332;
(Continued)

(56) References Cited

U.S. PATENT DOCUMENTS 4,757,850 A * 7/1988 Nakasaki ............ B60C 11/0309
  152/209.11
D700,881 S * 3/2014 Yao .............................. D12/535
(Continued)

FOREIGN PATENT DOCUMENTS

EP 0145009 A2 6/1985
EP 0368553 A2 5/1990
(Continued)

OTHER PUBLICATIONS

International Search Report, issued in PCT/JP2014/072610, PCT/ISA/210, dated Nov. 25, 2014.
(Continued)

*Primary Examiner* — Eric Hug
(74) *Attorney, Agent, or Firm* — Birch, Stewart, Kolasch & Birch, LLP (57) ABSTRACT

A tire for a two-wheeled motor vehicle has a tread (2) including: a center region (Cr); a pair of middle regions (Mr) located on both sides of the center region (Cr); and a pair of inner shoulder regions (Sr) located on both sides of the middle regions (Mr). The tread (2) has provided therein: inner tilted grooves (10) having outer ends (10e) provided within the middle regions (Mr); and outer tilted grooves (11) having inner ends (11i) provided within the middle regions (Mr). The groove area ratio of the center region (Cr) is from 34% to 39%, the groove area ratio of the middle regions (Mr) is from 14% to 19%, and the groove area ratio of the inner shoulder regions (Sr) is from 14% to 19%.

6 Claims, 5 Drawing Sheets

(52) U.S. Cl.
CPC ............... *B60C 2011/0313* (2013.01); *B60C 2011/0334* (2013.01); *B60C 2011/0344* (2013.01); *B60C 2011/0358* (2013.01); *B60C 2011/0374* (2013.01); *B60C 2011/0376* (2013.01); *B60C 2011/0379* (2013.01); *B60C 2011/0388* (2013.01); *B60C 2200/10* (2013.01)

(58) Field of Classification Search
CPC ..... B60C 2011/0341; B60C 2011/0344; B60C 2011/0346; B60C 2011/0358; B60C 2011/0372; B60C 2011/0374; B60C 2011/0381; B60C 2011/0383; B60C 2200/10
USPC ................ 162/209.11; D12/534; 152/209.11
See application file for complete search history.

(56) References Cited

U.S. PATENT DOCUMENTS

| | | | |
|---|---|---|---|
| 2005/0098250 A1 | 5/2005 | Ito | |
| 2005/0115653 A1* | 6/2005 | Miyasaka | B60C 11/0302 152/209.1 |
| 2006/0219342 A1* | 10/2006 | Steinbach | B60C 11/0302 152/209.11 |
| 2009/0255615 A1 | 10/2009 | Ishiyama et al. | |
| 2010/0193095 A1 | 8/2010 | Nakagawa | |
| 2012/0312437 A1 | 12/2012 | Harada | |
| 2013/0199682 A1 | 8/2013 | Takenaka | |
| 2013/0199683 A1 | 8/2013 | Takenaka | |

FOREIGN PATENT DOCUMENTS

| | | |
|---|---|---|
| EP | 0906836 A2 | 4/1999 |
| JP | 2003-211917 A | 7/2003 |
| JP | 2005-138807 A | 6/2005 |
| JP | 2007-55511 A | 3/2007 |
| JP | 2007-506590 A | 3/2007 |
| JP | 2009-29176 A | 2/2009 |
| JP | 2013-1161 A | 1/2013 |
| JP | 2013-159207 A | 8/2013 |
| JP | 2013-159208 A | 8/2013 |

OTHER PUBLICATIONS

Written Opinion of the International Searching Authority, issued in PCT/JP2014/072610, PCT/ISA/237, dated Nov. 25, 2014.
Extended European Search Report, dated Mar. 21, 2017, for counterpart European Application No. 14847754.0.

* cited by examiner

MOTORCYCLE TIRE

TECHNICAL FIELD

The present invention related to a motorcycle tire having an excellent wet grip performance, dry grip performance and cornering performance.

BACKGROUND ART

Conventionally, in order to improve wet grip performance on straight traveling as well as dry grip performance on cornering, various motorcycle tires have been proposed. For instance, a motorcycle tire including a tread portion with a central region and a shoulder region disposed on both sides of the central region has been proposed, wherein the respective central and shoulder regions have a different groove area ratio. The tire includes the central region with a high groove area ratio and the shoulder regions with a low groove area ratio.

Meanwhile, motorcycle tires are required to have excellent cornering performance. In order to improve cornering performance, it is necessary to improve the transient characteristic during cornering. The transient characteristic is represented by the degree of change in steering angle of a motorcycle during cornering. For example, in case of a tire with an excellent cornering performance, the change in steering angle during cornering of period from the beginning to the end is small. Thus, a rider may steer the motorcycle smoothly. On the other hand, in case of a tire with poor cornering performance, the change in steering angle during cornering of period from the beginning to the end is large. Thus, a rider may be difficult to steer the motorcycle smoothly. The change in steering angle of a motorcycle during cornering basically depends on change in a pattern rigidity of the tread portion of the tire. That is, when the change in the pattern rigidity in an axial direction of the tire is large, the change in steering angle tends to be large.

In case of a tire with different groove area in the respective central region and the shoulder region of the tread portion, the change in the pattern rigidity tends to be large. Accordingly, the above mentioned tire may be difficult to obtain an excellent transient characteristic owing to large change in the steering angle during cornering.

CITATION LIST

Patent Literature

Patent document 1: Japanese Unexamined Patent Application Publication No. 2013-1161

SUMMARY OF INVENTION

Technical Problem

The present invention has been made in view of circumstances described above, and has a main object to provide a motorcycle tire having an excellent wet grip performance, dry grip performance and cornering performance.

Solution to Problem

According to the present invention, a motorcycle tire having a tread portion, the tire includes the tread portion including a central region having a 28% region of a tread development width and a center corresponding to a tire equator, a pair of middle regions each having a 14% region of the tread development width from an axially outer edge of the central region, and a pair of inner shoulder regions each having a 14% region of the tread development width from each axially outer edge of each middle region. The tread portion is provided with a plurality of inner inclined grooves each extending from an inner end located within the central region to an outer end located within one of the middle regions and a plurality of outer inclined grooves each extending from an inner end located within one of the middle regions to an outer end located within one of the inner shoulder regions. A central groove area ratio, which is a ratio of a groove area to a ground contact surface within the central region, is in a range of from 34% to 39%. Each middle groove area ratio, which is a ratio of a groove area to a ground contact surface within each middle region, is in a range of from 14% to 19%. Each inner shoulder groove area ratio, which is a ratio of a groove area to a ground contact surface within each inner shoulder region, is in a range of from 14% to 19%.

In another aspect of the invention, the central region may be provided with a circumferentially and continuously extending circumferential groove on the tire equator.

In another aspect of the invention, each outer inclined groove may extend outwardly beyond a tread edge.

In another aspect of the invention, the tread portion may be designated a rotational direction, each inner inclined groove may be inclined backwardly in the rotational direction from the inner end toward the outer end, each inner inclined groove may have an angle within the central region in a range of from 2 to 30 degrees with respect to a circumferential direction of the tire, and may have an angle within the middle region in a range of from 20 to 30 degrees with respect to a circumferential direction of the tire.

In another aspect of the invention, each outer inclined groove may be inclined forwardly in the rotational direction from the inner end axially outwardly, and each outer inclined groove may have an angle within the inner shoulder region in a range of from 50 to 70 degrees with respect to the circumferential direction of the tire.

Advantageous Effects of Invention

The motorcycle tire in accordance with the present invention includes the tread portion including the central region, a pair of middle regions located axially outward of the central region and a pair of inner shoulder regions located axially outward of middle regions.

The central groove area ratio, which is a ratio of a groove area to a ground contact surface within the central region, is set in a range of from 34% to 39%. Thus, drainage performance on the central region which mainly comes into contact with the ground during straight traveling may be improved, thereby improving wet grip performance on straight traveling.

Each middle groove area ratio, which is a ratio of a groove area to a ground contact surface within each middle region, is set in a range of from 14% to 19%, and each inner shoulder groove area ratio, which is a ratio of a groove area to a ground contact surface within each inner shoulder region, is set in a range of from 14% to 19%. Since the pattern rigidity of the respective middle regions and the inner shoulder regions is greater than that of the central region, dry grip performance during cornering can be improved.

The tread portion is provided with the plurality of inner inclined grooves each extending from the inner end located within the central region to the outer end located within one of the middle regions, and the plurality of outer inclined grooves each extending from the inner end located within one of the middle regions to the outer end located within one of the inner shoulder regions. That is, in the middle region, each outer end of each inner inclined groove and each inner end of each outer inclined groove are provided. Since stress tends to concentrate on outer and inner ends of grooves, the pattern rigidity of the middle region tends to be lower than that of the inner shoulder region. Thus, the pattern rigidity difference between the central region and the middle region becomes small, and therefore the transient characteristic can be improved.

Accordingly, the motorcycle tire in accordance with the present embodiment may improve wet grip performance, dry grip performance and cornering performance in a well balanced manner.

DESCRIPTION OF EMBODIMENTS

An embodiment of the present invention will be explained below with reference to the accompanying drawings.

Figure 1:
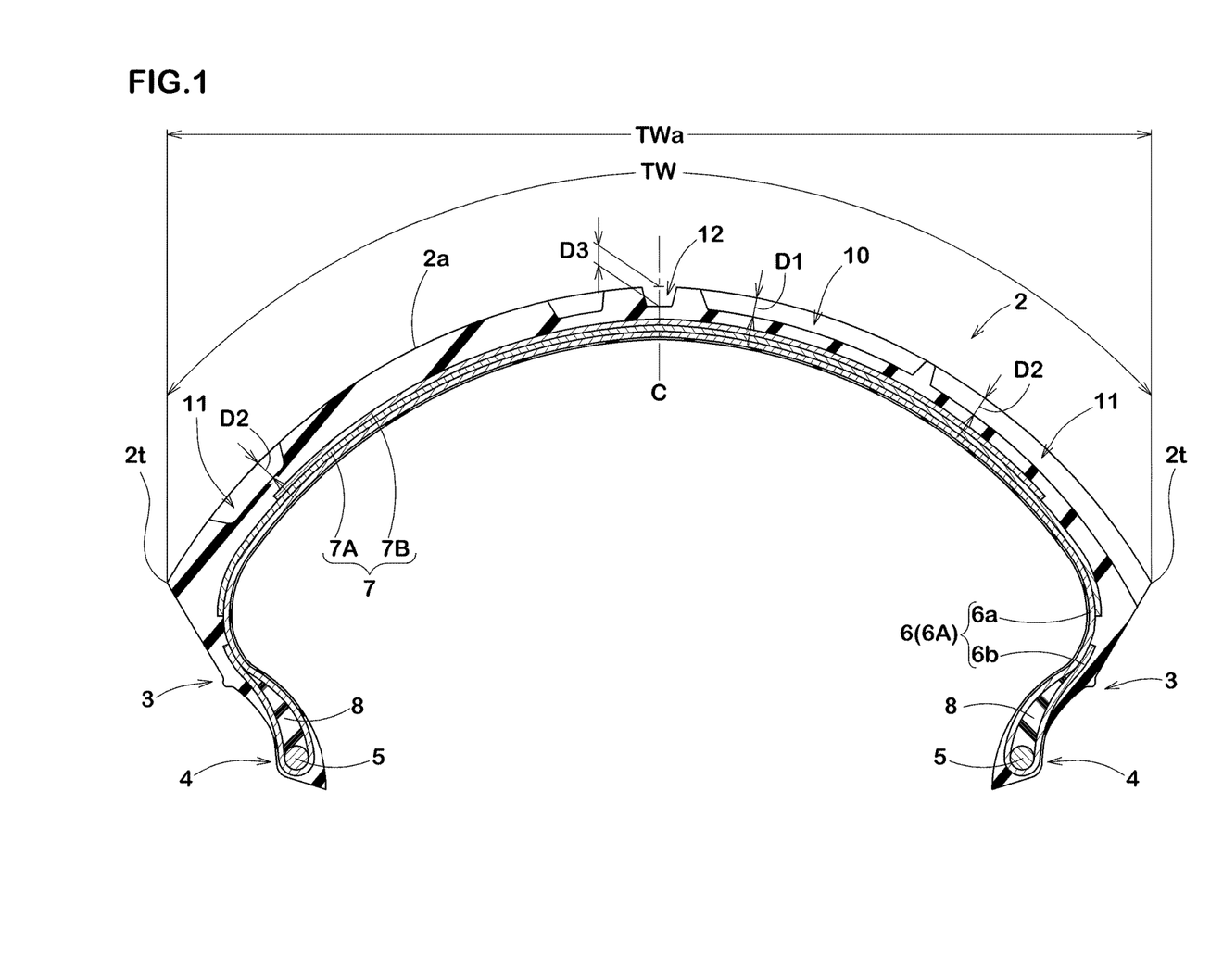
FIG. 1 is a cross-sectional view of a motorcycle tire in accordance with an embodiment of the present invention.
Figure 2:
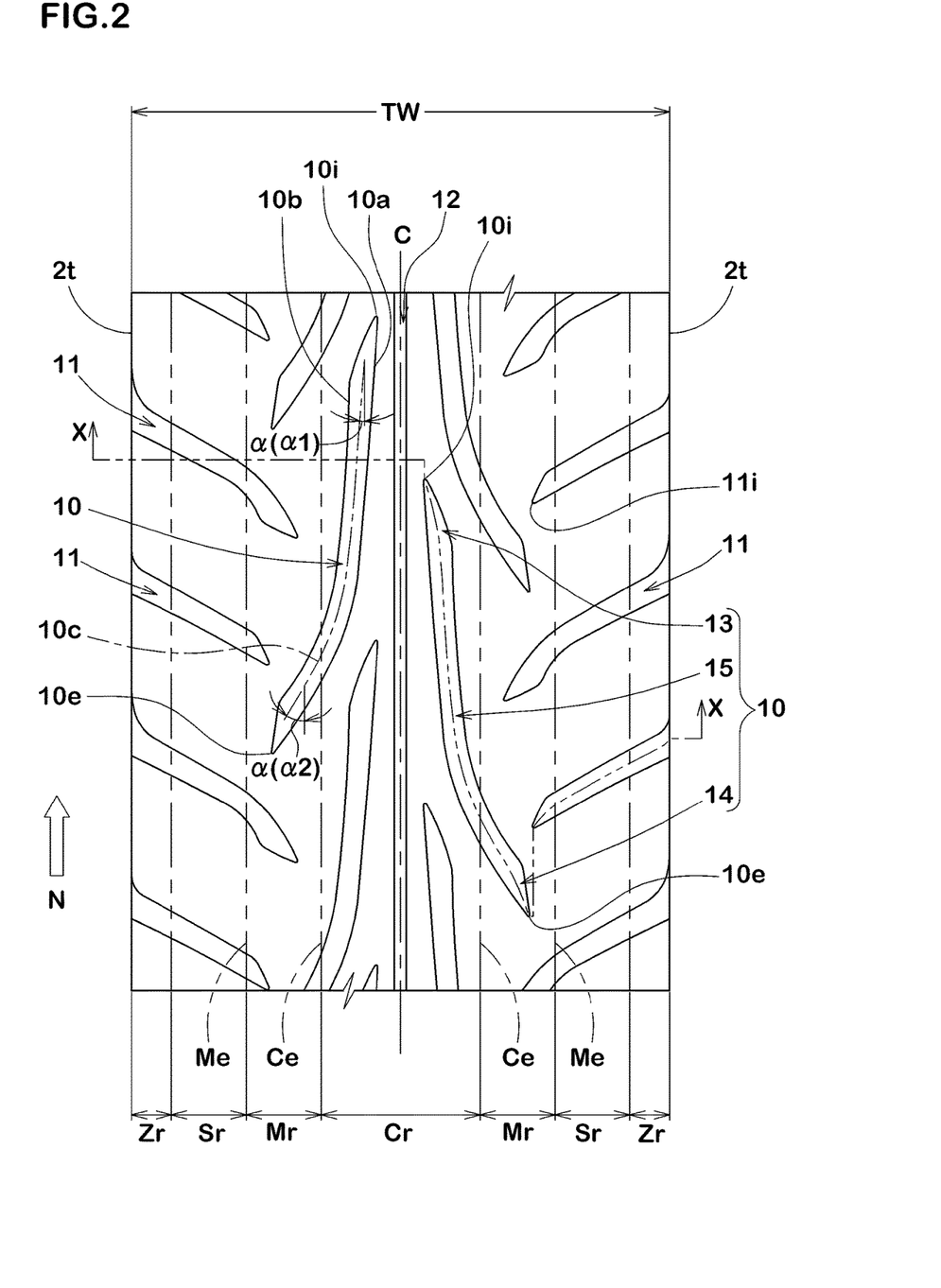
FIG. 2 is a development view of a tread portion of the motorcycle tire of FIG. 1.

FIG. 1 illustrates a cross-sectional view of a motorcycle tire (hereinafter, it may be simply referred to as "tire") in accordance with an embodiment of the present invention, and FIG. 2 illustrates a development view of a tread portion 2 of the motorcycle tire of FIG. 1. FIG. 1 corresponds to a cross section taken along a line X-X of FIG. 2. In this description, unless otherwise noted, dimensions of respective portions of the tire are values specified in the standard state in which the tire is mounted on a standard wheel rim with a standard pressure but is loaded with no tire load.

The standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

The standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As illustrated in FIG. 1, the tire in accordance with the present embodiment includes the tread portion 2 including an outer surface 2a between tread edges 2t and 2t which is formed in an arc shape that protrudes radially outwardly in order to obtain sufficient ground contact area when cornering with a deep camber angle. The tread width TWa, which is an axial distance between the tread edges 2t and 2t, corresponds to the tire maximum width. The tread development width TW is a development length of the outer surface 2a between the tread edges 2t and 2t.

The tire in accordance with the present embodiment includes a carcass 6 extending from the tread portion 2 to a bead core 5 in a bead portion 4 through a sidewall portion 3, and a tread reinforcing layer 7 disposed radially outward of the carcass in the tread portion 2.

The carcass 6 is configured as one carcass ply 6A. The carcass ply 6A includes a main portion 6a extending from the tread portion 2 to the bead core 5 disposed in the bead portion 4 through a sidewall portion 3, and a turn-up portion 6b turned up around the bead core 5 from the axially inside to the outside of the tire.

The carcass ply 6A includes a carcass cord, for example, being oriented at angle in a range of from 75 to 90 degrees, more preferably in a range of from 80 to 90 degrees with respect to the tire equator C. For the carcass cord, an organic fiber cord such as nylon, polyester, rayon and the like may preferably be employed. A bead apex 8 made of a hard rubber is disposed between the main portion 6a and the turn-up portion 6b of the carcass ply 6A.

The tread reinforcing layer 7 includes at least one, preferably two belt plies 7A and 7B in this embodiment each of which includes a belt cord being oriented at an angle in a range of from 5 to 40 degrees with respect to the tire equator C, for example. The belt plies 7A and 7B are overlapped so that the belt cords of each ply cross one another. For the belt cord, steel cord, aramid cord or rayon cord may preferably be employed.

As illustrated in FIG. 2, the tire in accordance with the present embodiment includes an asymmetric tread pattern having a designated rotational direction N. The rotational direction N of the tire is indicated using characters or the like on the sidewall 3 (illustrates in FIG. 1).

The tread portion 2 includes a central region Cr having a center corresponding to the tire equator C, a pair of middle regions Mr located axially outward of the central region Cr, a pair of inner shoulder regions Sr located axially outward of the middle regions Mr and a pair of outer shoulder regions Zr located axially outward of the inner shoulder regions Sh.

The central region Cr is a 28% region of the tread development width TW and which mainly comes into contact with the ground during straight traveling.

Each middle region Mr is a 14% region of the tread development width TW and is located axially outwardly from the axially outer end of the central region Cr. The middle region Mr mainly comes into contact with the ground during an initial stage of cornering.

Each inner shoulder region Sh is a 14% region of the tread development width TW and is located axially outward of each outer end Me of the middle region Mr. The inner shoulder region Sh mainly comes into contact with the ground during a middle stage of cornering.

Each outer shoulder region Zr is an 8% region of the tread development width TW and is located between the inner shoulder region Sh and the tread edge 2t. The outer shoulder region Zr mainly comes into contact with the ground during a final stage of cornering.

The tread portion 2 in accordance with the present embodiment has a central groove area ratio of 34% to 39%, a middle groove area ratio of 14% to 19% and an inner shoulder groove area ratio of 14% to 19%.

The central groove area ratio is a ratio of a groove area to a ground contact area, within the central region Cr. The middle groove area ratio is a ratio of a groove area to a ground contact area, within the middle region Mr. The inner shoulder groove area ratio is a ratio of a groove area to a ground contact area, within the inner shoulder region Sh. Although it is not particularly limited, the outer shoulder groove ratio, which is a ratio of groove area to a ground contact area within the outer shoulder region, is preferably in a range of from 14% to 19%. Each ground contact area described above is a gross ground contact area of each region, that is, a total area of a groove area and a net ground contact area.

In order to achieve each groove area ratio, the tread portion 2 of the tire in accordance with the present embodiment is provided with a plurality of inner inclined grooves 10, a plurality of outer inclined grooves 12 and a circumferentially and continuously extending circumferential groove 12.

In this embodiment, on both sides of the tire equator C of the tread portion 2, the inner inclined grooves 10 and the outer inclined grooves 11 are provided.

Each of the inner inclined grooves 10 extends from an axially inner end 10i located within the central region Cr to an axially outer end 10e located within the middle region Mr.

In this embodiment, the inner inclined groove 10 is inclined backwardly in the rotational direction N from the inner end 10i toward the outer end 10e. Such an inner inclined groove 10 may evacuate smoothly the water introduced in the inner inclined grooves 10 outwardly from the tread portion 2 using a tire rotation during straight traveling. The inner inclined grooves 10 are not limited to this aspect, but it may be inclined forwardly in the rotational direction N from the inner end 10i toward the outer end 10e.

In this embodiment, the inner inclined groove 10 includes an inner portion 13 having the inner end 10i, an outer portion having the outer end 10e, and an intermediate portion 14 disposed between the outer portion 14 and the inner portion 13.

The inner portion 12 has a width gradually decreasing toward the inner end 10i. Such an inner portion 13 may reduce the change of pattern rigidity in the central region Cr. The inner portion 13 is formed as a portion having a large degree of reduction of the width by at least one of groove edges 10a and 10b which is bent distinctly. The width is a distance between groove edges 10a and 10b measured perpendicular to the groove centerline 10c of the inner inclined groove 10. The groove centerline 10c is a centerline that extends along the longitudinal direction between grove edges 10a and 10b of the major part of the inner inclined groove 10.

The outer portion 14 has a width gradually decreasing toward the outer end 10e. Thus, the change of pattern rigidity in the middle region can be small, and therefore transient characteristic during cornering can also be improved.

The intermediate portion 15 is mainly located in the central region Cr. With this, a large groove area ratio of the central region Cr may be ensured. Furthermore, the intermediate portion 15 includes a portion where a constant width continues in a certain length. Since the intermediate portion 15 has a small drainage resistance, smooth drainage performance can be obtained so that the wet grip performance on straight traveling is improved.

Preferably, in the central region Cr, the inner inclined groove 10 has an angle $\alpha1$ in a range of from 2 to 30 degrees with respect to the circumferential direction of the tire. When the angle $\alpha1$ is less than 2 degrees, it may be difficult to collect the water from between the central region Cr and the ground into the inner inclined groove 10, and thereby being deteriorated wet grip performance. When the angle $\alpha1$ is more than 30 degrees, a force that creates a steering angle becomes larger since the axial component of the inner inclined groove 10 tends to be large. This may prevent a smooth transition from straight traveling to an initial stage of cornering.

In general, in order to improve cornering performance at the initial stage, it is effective to be leaned a motorcycle quickly from a straight traveling state while maintaining a small steering angle (hereinafter, it may be referred to as "roll"). On the other hand, in order to improve cornering performance between the middle stage and the final stage of cornering, it may be effective to prevent that the motorcycle further leans while maintaining a large steering angle. A force that produces a steering angle to a tire during traveling is created along grooves within the footprint. Accordingly, the longer the axial component of grooves, the larger the force that produces a steering angle creates. Thus, the central region Cr, which mainly comes into contact with the ground during straight traveling, is preferably configured to create less force that produces the steering angle. Preferably, the angle $\alpha1$ of the inner inclined groove 10 is in a range of not more than 30 degrees, more preferably not more than 20 degrees. In this description, an angle of a groove is defined as an average angle between the maximum angle and the minimum angle using the groove centerline.

Preferably, the angle $\alpha2$ of the inner inclined groove 10 within the middle region Mr is in a range of from 20 to 30 degrees with respect to the circumferential direction of the tire. When the angle $\alpha2$ is less than 20 degrees, the force for producing a steering angle tends to be reduced at an initial stage of cornering, and then it may be difficult to obtain smooth cornering from the initial stage to the middle stage of cornering. When the angle $\alpha2$ is more than 20 degrees, the force for producing a steering angle tends to be increased at the initial stage of cornering, and then it may be difficult to offer a smooth roll motion from the straight traveling.

Regarding the force for producing a steering angle, it is preferably large at the initial stage of cornering than the straight traveling. Thus, the angle $\alpha2$ is preferably set greater than the angle $\alpha1$ of the inner inclined groove 10 at the central region Cr.

In order to reduce the change of the steering angle to improve cornering performance, the angle of the inner inclined groove 10 with respect to the circumferential direction preferably increases gradually from the central region Cr toward the middle region Mr.

Figure 3:
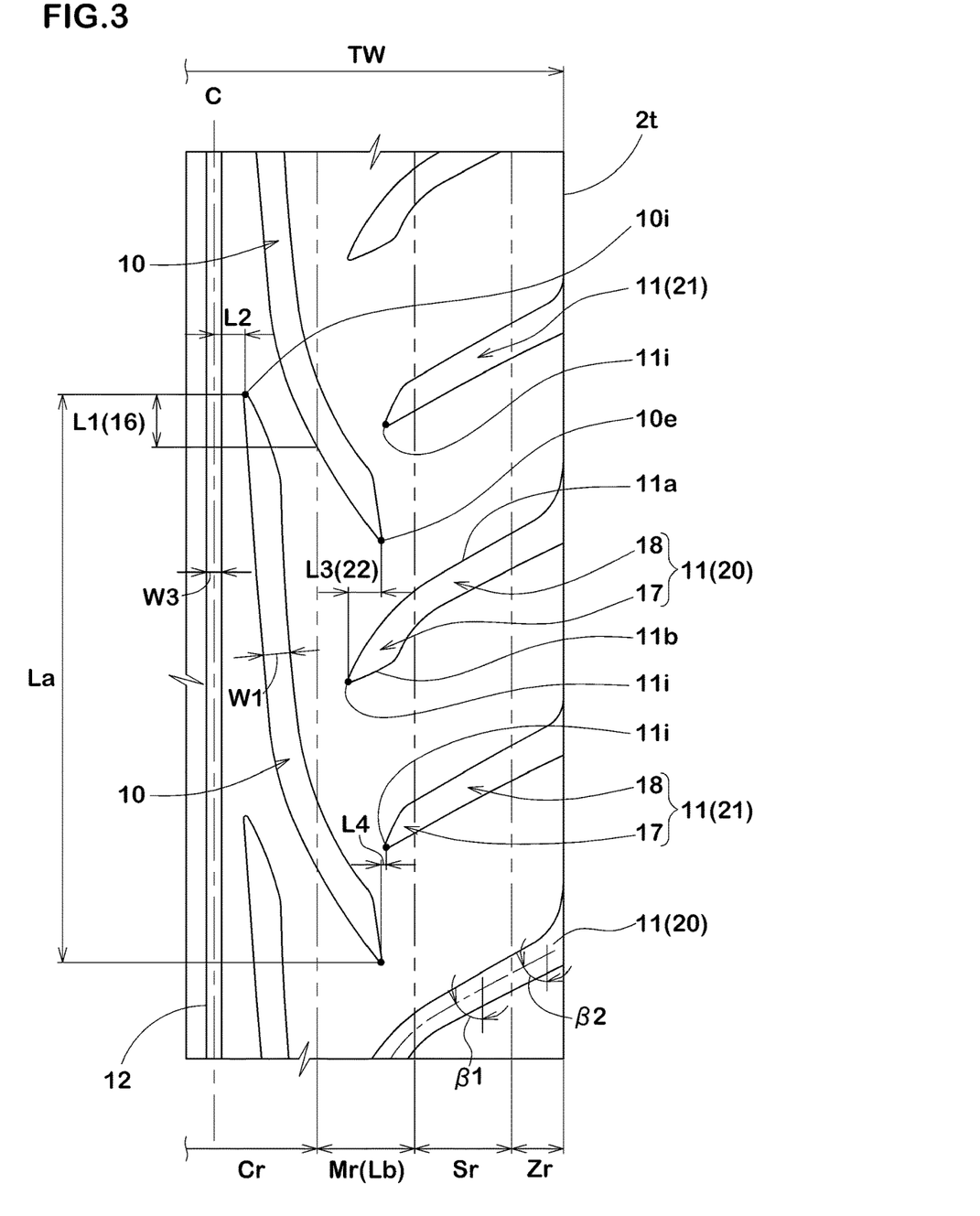
FIG. 3 is an enlarged view of the right side of the tread portion of FIG. 2.

As illustrated in FIG. 3, in the central region Cr, a pair of circumferentially adjacent inner inclined grooves 10 and 10 are overlapped one another in the circumferential direction so as to have an overlap region 16. Thus, drainage performance on the central region Cr may further be improved so that the wet grip performance during straight traveling improves. Preferably, the overlap region 16 has a circumferential length L1 in a range of from 5% to 15% of the circumferential length La of the inner inclined groove 10 in order to ensure a sufficient pattern rigidity of the central region Cr.

Preferably, the axial length L2 from the inner end 10i of the inner inclined groove 10 to the tire equator C is in a range of from 1% to 5% of the tread development width TW. With this, a pattern rigidity of the central region Cr around the tire equator C can be ensured while improving wet grip performance of the tire.

Each of the outer inclined grooves 11 extends from the inner end 11i located within the middle region Mr to the inner shoulder region Sh with an inclination. In the middle region Mr, each outer end 10e of each inner inclined groove 10 and each inner end 11i of each outer inclined groove 11 are provided. Since stress tends to concentrate on the respective the outer ends 10e and inner ends 11i of grooves, the pattern rigidity of the middle region Mr tends to be lower than that of the inner shoulder region Sh which has the same groove area ratio with the middle region Mr. Thus, the pattern rigidity difference between the central region Cr and the middle region Sr tends to be small, and the change of steering angle can be prevented. Accordingly, the transient characteristic can be improved. Therefore, the motorcycle tire in accordance with the present invention may improve wet grip performance, dry grip performance and cornering performance in a well balanced manner.

In this embodiment, these outer inclined grooves 11 extend axially outwardly beyond the tread edge 2t. With this, drainage performance can be improved. Furthermore, since the outer inclined grooves 11 extend axially outwardly beyond the tread edge 2t, less pattern rigidity can be offered around the tread edges 2t. With this, the transient characteristic may further be improved.

Each outer inclined groove 11 includes a first portion 17 having the inner end 11i and a second portion 18 connected to the first portion 17.

The first portion 17 has a width gradually decreasing toward the inner end 11i. Such a first portion 17 may prevent stress concentration on the inner end 11i. The first portion 17, same as the inner portion 13 and the outer portion 14, is formed as a portion having a large degree of reduction of the width by at least one groove edges 11a and 11b of the outer inclined groove 11 being bent distinctly.

The second portion 18 includes a portion where a constant width continues in a certain length. The second portion 18 is located in both of the inner shoulder region Sh and the outer shoulder region Zr. With this, the drainage performance on the inner shoulder region Sh and the outer shoulder region Zr can be improved.

In this embodiment, each of the outer inclined grooves 11 is inclined axially outwardly from the inner end 11i toward the rotational direction N. These outer inclined grooves 11 may create a large force for producing a steering angle during cornering because the outer inclined grooves 11 include a large axial component length. Accordingly, the tire in accordance with the present embodiment may offer a cornering motion during the middle stage and a final stage of cornering, so as to prevent the roll motion while increasing the steering angle. In order to further improve the advantageous effect, the angle β1 of the outer inclined groove 11 within the inner shoulder region Sh is preferably in a range of from 50 to 70 degrees, more preferably in a range of from 55 to 65 degrees with respect to the circumferential direction of the tire.

Preferably, the angle β2 of the outer inclined groove 11 within the outer shoulder region Zr is in a range of from 55 to 75 degrees with respect to the circumferential direction of the tire. Such a tire may offer an excellent cornering performance at the final stage of cornering by creating a large force for producing the steering angle. When the angle β2 of the outer inclined groove 11 is more than 75 degrees, it may be difficult to obtain smooth cornering, since the force for producing the steering angle tends to be large.

The outer inclined grooves 11 include a first outer inclined groove 20 and a second outer inclined grooves 21, and which are arranged alternately in the circumferential direction of the tire.

The first outer inclined groove 20 includes the inner end 10i located axially inward of the outer end 10e of the inner inclined groove 10. Thus, the middle region Mr according to the present embodiment is provided with an overlap portion 22 where the inner inclined groove 10 and the first outer inclined groove 20 are partially overlap one another in the axial direction of the tire. Thus, an excellent drainage performance can be obtained by offering grooves so as to continue from the inner end 10i of the inner inclined groove 10 to the tread edge 2t on the tread portion 2. In order to obtain a suitable pattern rigidity of the middle region Mr, an axial length L3 of the overlap portion 22 is preferably in a range of from 10% to 50% of the axial width Lb of the middle region Mr.

The second outer inclined groove 20 includes the inner end 11i located axially outward of the outer end 10e of the inner inclined groove 10. The second outer inclined groove 20 may prevent that the pattern rigidity of the middle region decreases excessively. Preferably, the axial length L4 from the inner end 11i of the second outer inclined groove 20 to the outer end 10e of the inner inclined groove 10 is in a range of from 2% to 8% of the axial width Lb of the middle region Mr.

The circumferential groove 12 extends on the tire equator C in a straight shape. The circumferential groove 12 can evacuate water effectively near the tire equator C to improve wet grip performance during straight traveling. Preferably, the circumferential groove 12 has a width W3 in a range of from 35% to 65% of the maximum width W1 of the inner inclined grooves 10.

It is not particularly limited, but depths D1 (shown in FIG. 1) of the inner inclined grooves 10 are preferably in a range of from 4.0 to 5.0 mm, in order to improve wet grip performance during straight traveling as well as dry grip performance during cornering in a well balanced manner. In the same point of view, depths D2 of the outer inclined grooves 11 are preferably in a range of from 3.0 to 5.0 mm, and the depth D3 of the circumferential groove 12 is in a range of from 90% to 110% of the depth D1 of the inner inclined grooves 10.

In this embodiment, the tread portion 2 has the central groove area ratio of 34% to 39%, the middle groove area ratio of 14% to 19%, and the shoulder groove area ratio of 14% to 19% by being provided with the inner inclined grooves 10, the outer inclined grooves 11 and the circumferential groove 12. Thus, drainage performance of the central region Cr which mainly comes into contact with the ground during straight traveling can be improved, and therefore the wet grip performance during straight traveling improves. Furthermore, the pattern rigidity of the tread portion 2 may be enhanced in order toward the central region Cr, the middle regions Mr and the inner shoulder regions Sh. Accordingly, dry grip performance during cornering can be improved.

Meanwhile, when the central groove area ratio is less than 34%, a groove area within the central region Cr tends to be small, and wet grip performance during straight traveling may be deteriorated. When the central groove area ratio is more than 39%, pattern rigidity of the central region Cr tends to be small, and the pattern rigidity change between the central region Cr and the middle region Mr becomes large.

In the same point of view, the middle groove area ratio or the inner shoulder groove area ratio is less than 14%, the pattern rigidity of the middle region Mr or the inner shoulder region Sh tends to be large. Thus, the pattern rigidity change between the central region Cr and the middle region Mr becomes large. When the middle groove area ratio or the inner shoulder groove area ratio is more than 19%, the ground contact area of the middle region Mr and the inner shoulder region Sh tends to be small, and dry grip performance during cornering may be deteriorated.

While the embodiments in accordance with the present invention have been described in detail, the present invention is not limited to the illustrated embodiments, but can be modified and carried out in various aspects.

Example

Motorcycle tires having a basic structure illustrated in FIG. 1 and a basic tread pattern illustrated in FIG. 2 were manufactured based on details shown in Table 1, and then wet grip performance, dry grip performance and cornering performance of each tire was tested. The common specifications of tires and test procedures are as follows.

Tread development width TW: 70.8 mm
Inner inclined groove depth: 4.7 mm
Outer inclined groove depth: 4.0 mm
Circumferential groove depth: 4.7 mm
Central region width/Tread development width TW: 28%
Middle region width/Tread development width TW: 14%
Inner shoulder region/Tread development width TW: 14%
Outer shoulder region/Tread development width TW: 8%
Wet Grip Performance:

Each test tire was mounted on a motorcycle having a displacement of 250 cc as its front and rear wheels under the following conditions. Then, a test rider made the motorcycle run straightly on an asphalt test course covered with water film of 10 mm depth and 400 m length at a speed of 60 km/hr, and evaluated the traveling performance regarding wet grip performance by his feeling. The results are indicated using a score of a maximum 5 where the Ref 1 is set to 4.0. The larger the value, the better the performance is.

Front Wheel:
Tire size: 110/70R17
Rim: MT3.00×17
Internal pressure: 225 kPa
Rear Wheel:
Tire size: 140/70ZR17
Rim: MT4.00×17
Internal pressure: 250 kPa Dry Grip and Cornering Performance A test rider made the above mentioned motorcycle run on a dry asphalt loop test course, and then the traveling performance regarding dry grip and cornering performance such as transient characteristic were evaluated by his feeling. The results are indicated using a score of a maximum 5 where the Ref. 1 is set to 4.0. The larger the value, the better the performance is.

The test results are shown in Table 1.

TABLE 1

Figure 5A:
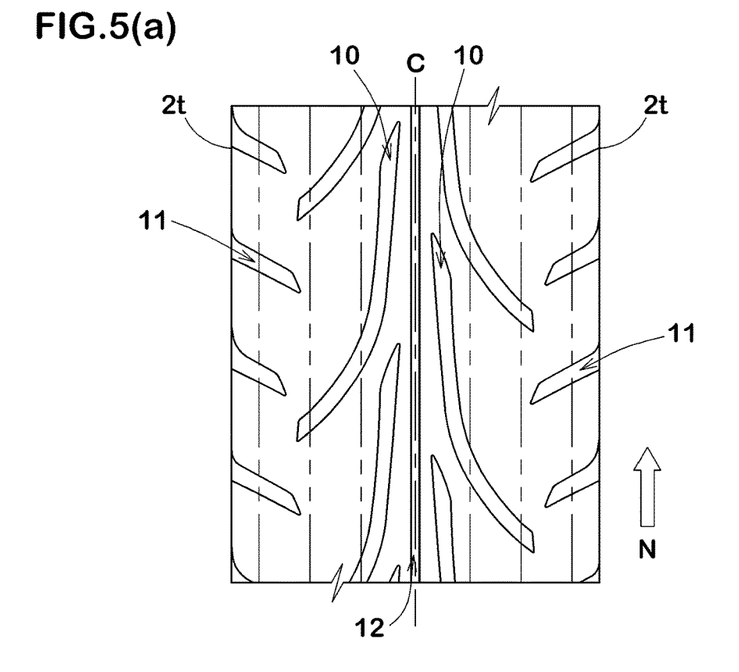
FIG. 5A is a development view of the tread portion in accordance with comparative example and FIG. 5B is a development view of the tread portion in accordance with another comparative example.
Figure 5B:
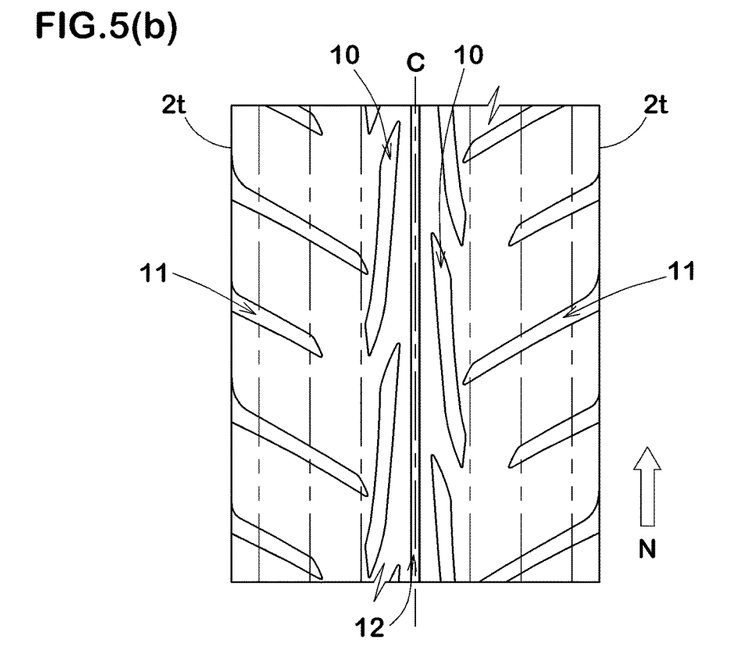

|  | Ref. 1 | Ref. 2 | Ex. 1 | Ex. 2 | Ref. 3 | Ex. 3 | Ex. 4 | Ref. 4 | Ref. 5 |
| --- | --- | --- | --- | --- | --- | --- | --- | --- | --- |
| Tread pattern figure | FIG. 5A | FIG. 5B | FIG. 2 | FIG. 2 | FIG. 2 | FIG. 2 | FIG. 2 | FIG. 2 | FIG. 2 |
| Central groove area ratio (%) | 30 | 37 | 37 | 34 | 30 | 34 | 39 | 42 | 37 |
| Middle groove area ratio (%) | 25 | 16 | 16 | 19 | 25 | 16 | 16 | 16 | 12 |
| Inner shoulder groove area ratio (%) | 20 | 17 | 17 | 14 | 20 | 17 | 17 | 17 | 17 |
| Inner inclined groove angle α1 at central region (deg.) | 13 | 13 | 13 | 13 | 13 | 13 | 13 | 13 | 13 |
| Inner inclined groove angle α2 at middle region (deg.) | 25 | 25 | 25 | 25 | 25 | 25 | 25 | 25 | 25 |
| Outer inclined groove angle β1 at inner shoulder region (deg) | 55 | 55 | 55 | 55 | 55 | 55 | 55 | 55 | 55 |
| Wet grip performance [Score of maximum 5] | 4.0 | 4.0 | 5.0 | 5.0 | 4.5 | 4.5 | 5.0 | 5.0 | 4.5 |
| Dry grip performance [Score of maximum 5] | 4.0 | 4.5 | 5.0 | 5.0 | 4.0 | 5.0 | 4.5 | 4.0 | 5.0 |
| Cornering performance [Score of maximum 5] | 4.0 | 3.5 | 5.0 | 5.0 | 4.5 | 5.0 | 5.0 | 3.5 | 3.5 |

|  | Ex. 5 | Ref. 6 | Ref. 7 | Ex. 6 | Ref. 8 | Ex. 7 | Ex. 8 | Ex. 9 | Ex. 10 |
| --- | --- | --- | --- | --- | --- | --- | --- | --- | --- |
| Tread pattern figure | FIG. 2 | FIG. 2 | FIG. 2 | FIG. 2 | FIG. 2 | FIG. 2 | FIG. 2 | FIG. 2 | FIG. 2 |
| Central groove area ratio (%) | 37 | 37 | 37 | 37 | 37 | 37 | 37 | 37 | 37 |
| Middle groove area ratio (%) | 14 | 21 | 16 | 16 | 16 | 16 | 16 | 16 | 16 |
| Inner shoulder groove area ratio (%) | 17 | 17 | 12 | 19 | 21 | 17 | 17 | 17 | 17 |
| Inner inclined groove angle α1 at central region (deg.) | 13 | 13 | 13 | 13 | 13 | 10 | 30 | 35 | 13 |
| Inner inclined groove angle α2 at middle region (deg.) | 25 | 25 | 25 | 25 | 25 | 25 | 25 | 25 | 15 |
| Outer inclined groove angle β1 at inner shoulder region (deg) | 55 | 55 | 55 | 55 | 55 | 55 | 55 | 55 | 55 |
| Wet grip performance [Score of maximum 5] | 5.0 | 5.0 | 4.5 | 5.0 | 5.0 | 5.0 | 4.5 | 4.5 | 4.5 |
| Dry grip performance [Score of maximum 5] | 5.0 | 4.0 | 4.5 | 5.0 | 4.0 | 5.0 | 5.0 | 5.0 | 5.0 |
| Cornering performance [Score of maximum 5] | 4.5 | 4.0 | 4.0 | 4.5 | 3.5 | 5.0 | 4.5 | 4.0 | 4.0 |

Figure 4A:
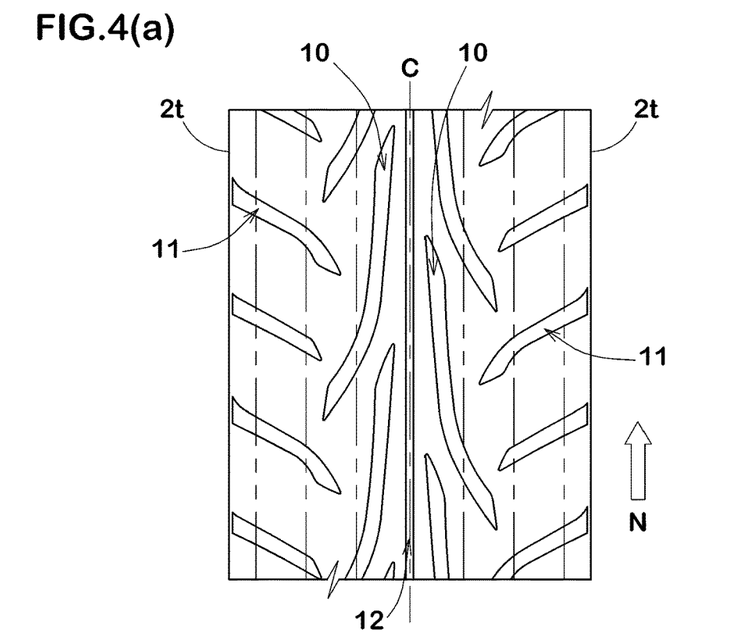
FIG. 4A is a development view of the tread portion in accordance with another embodiment of the invention.
Figure 4B:
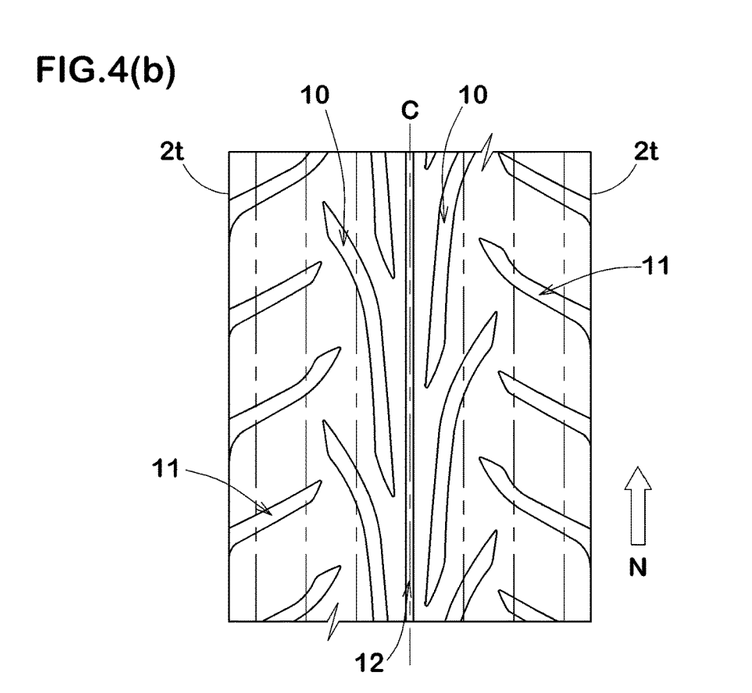
FIG. 4B is a development view of the tread portion in accordance with still another embodiment of the invention.

|  | Ex. 11 | Ex. 12 | Ex. 13 | Ex. 14 | Ex. 15 | Ex. 16 | Ex. 17 | Ex. 18 | Ex. 19 |
| --- | --- | --- | --- | --- | --- | --- | --- | --- | --- |
| Tread pattern figure | FIG. 2 | FIG. 2 | FIG. 2 | FIG. 2 | FIG. 2 | FIG. 2 | FIG. 2 | FIG. 4A | FIG. 4B |
| Central groove area ratio (%) | 37 | 37 | 37 | 37 | 37 | 37 | 37 | 37 | 37 |
| Middle groove area ratio (%) | 16 | 16 | 16 | 16 | 16 | 16 | 16 | 16 | 16 |
| Inner shoulder groove area ratio (%) | 17 | 17 | 17 | 17 | 17 | 17 | 17 | 17 | 17 |

TABLE 1-continued

| | | | | | | | | | |
|---|---|---|---|---|---|---|---|---|---|
| Inner inclined groove angle α1 at central region (deg.) | 13 | 13 | 13 | 13 | 13 | 13 | 13 | 13 | 13 |
| Inner inclined groove angle α2 at middle region (deg.) | 20 | 30 | 35 | 25 | 25 | 25 | 25 | 25 | 25 |
| Outer inclined groove angle β1 at inner shoulder region (deg) | 55 | 55 | 55 | 45 | 50 | 70 | 75 | 55 | 55 |
| Wet grip performance [Score of maximum 5] | 4.5 | 4.5 | 4.5 | 4.5 | 4.5 | 4.5 | 4.5 | 4.5 | 4.5 |
| Dry grip performance [Score of maximum 5] | 5.0 | 5.0 | 5.0 | 5.0 | 5.0 | 5.0 | 5.0 | 5.0 | 5.0 |
| Cornering performance [Score of maximum 5] | 4.5 | 4.5 | 4.0 | 4.0 | 4.5 | 4.5 | 4.0 | 5.0 | 5.0 |

From the test results, it was confirmed that Example tires in accordance with the present embodiment have improved each performance in a well balanced manner as compared with the comparative examples.

REFERENCE SIGNS LIST

2 Tread portion
2t tread edge
10 Inner inclined groove
10e outer end
11 Outer inclined groove
11i inner end
Cr Central region
Mr Middle region
Sr Inner shoulder region
N Rotational direction

The invention claimed is:

1. A motorcycle tire having a tread portion, the tire comprising:
the tread portion comprising a central region having a 28% region of a tread development width and a center corresponding to a tire equator, a pair of middle regions each having a 14% region of the tread development width from an axially outer edge of the central region, and a pair of inner shoulder regions each having a 14% region of the tread development width from each axially outer edge of each middle region;
the tread portion being provided with a plurality of inner inclined grooves each extending from an inner end located within the central region to an outer end located within one of the middle regions and a plurality of outer inclined grooves each extending from an inner end located within one of the middle regions to an outer end located within one of the shoulder regions, wherein the plurality of outer inclined grooves has a depth smaller than a depth of the plurality of inner inclined grooves, wherein the depth of the plurality of inner inclined grooves is in a range of from 4.0 to 5.0 mm, and wherein the depth of the plurality of outer inclined grooves is equal to or more than 3.0 mm;
a central groove area ratio, which is a ratio of a groove area to a ground contact surface within the central region, being in a range of from 34% to 39%;
each middle groove area ratio, which is a ratio of a groove area to a ground contact surface within each middle region, being in a range of from 14% to 19%; and
each inner shoulder groove area ratio, which is a ratio of a groove area to a ground contact surface within each inner shoulder region, being in a range of from 14% to 19%.

2. The motorcycle tire according to claim 1, wherein the central region is provided with a circumferentially and continuously extending circumferential groove on the tire equator.

3. The motorcycle tire according to claim 1, wherein each outer inclined groove extends outwardly beyond a tread edge.

4. The motorcycle tire according to claim 1,
wherein the tread portion is designated a rotational direction,
each inner inclined groove is inclined backwardly in the rotational direction from the inner end toward the outer end,
each inner inclined groove has an angle within the central region in a range of from 2 to 30 degrees with respect to a circumferential direction of the tire, and has an angle within the middle region in a range of from 20 to 30 degrees with respect to a circumferential direction of the tire.

5. The motorcycle tire according to claim 4,
wherein each outer inclined groove is inclined forwardly in the rotational direction from the inner end axially outwardly, and each outer inclined groove has an angle within the inner shoulder region in a range of from 50 to 70 degrees with respect to the circumferential direction of the tire.

6. The motorcycle tire according to claim 2, wherein a depth of the circumferential groove is in a range of from 90% to 110% of the depth of the plurality of inner inclined grooves.

* * * * *